US012284287B2

(12) United States Patent
Fletcher et al.

(10) Patent No.: US 12,284,287 B2
(45) Date of Patent: Apr. 22, 2025

(54) COMPUTER-IMPLEMENTED SYSTEM AND METHOD PROVIDING A DECENTRALISED PROTOCOL FOR THE RECOVERY OF CRYPTOGRAPHIC ASSETS

(71) Applicant: nChain Licensing AG, Zug (CH)

(72) Inventors: John Fletcher, Cambridge (GB); Silvia Bartolucci, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/380,645

(22) Filed: Oct. 16, 2023

(65) Prior Publication Data

US 2024/0048387 A1 Feb. 8, 2024

Related U.S. Application Data

(63) Continuation of application No. 17/833,391, filed on Jun. 6, 2022, now Pat. No. 11,818,269, which is a
(Continued)

(30) Foreign Application Priority Data

Jun. 13, 2017 (GB) .................................... 1709367

(51) Int. Cl.
*H04L 29/06* (2006.01)
*H04L 9/06* (2006.01)
(Continued)

(52) U.S. Cl.
CPC .......... *H04L 9/3226* (2013.01); *H04L 9/0637* (2013.01); *H04L 9/085* (2013.01);
(Continued)

(58) Field of Classification Search
None
See application file for complete search history.

(56) References Cited

U.S. PATENT DOCUMENTS

2005/0149739 A1* 7/2005 Hopkins ............... H04L 9/0894
713/184
2017/0185998 A1 6/2017 Jung
(Continued)

FOREIGN PATENT DOCUMENTS

| WO | 2016008659 A1 | 1/2016 |
| WO | 2017001972 A1 | 1/2017 |
| WO | 2017147696 A1 | 9/2017 |

OTHER PUBLICATIONS

Pratyush Dikshit, (Efficient Weighted Threshold ECDSA for Securing Bitcoin Wallet—IEEE 978-1-5090-5942-3/17) (Year: 2017).*
(Continued)

*Primary Examiner* — Andrew J Steinle
(74) *Attorney, Agent, or Firm* — Tarolli, Sundheim, Covell & Tummino LLP (57) ABSTRACT

Techniques are presented to enable recovery of one or more digital assets held on a blockchain after a private key is lost. The computer implemented method comprises setting access for the one or more digital assets held on the blockchain under the public key Pk and accessible using the corresponding private key Sk of the user such that the one or more digital assets are also accessible using a private key x shared by a congress on the blockchain network, each member of the congress having a private key share $x_i$ to be used in a threshold signature scheme used to generate a valid signature. As a result of the private key Sk being lost, the congress accesses the one or more digital assets on behalf of the user in response to the user proving their identity to the congress by providing a recovery password.

18 Claims, 2 Drawing Sheets

Related U.S. Application Data continuation of application No. 16/622,275, filed as application No. PCT/IB2018/054104 on Jun. 7, 2018, now Pat. No. 11,356,263.

(51) Int. Cl.
*H04L 9/08* (2006.01)
*H04L 9/30* (2006.01)
*H04L 9/32* (2006.01)
*H04L 9/00* (2022.01)

(52) U.S. Cl.
CPC ............ *H04L 9/088* (2013.01); *H04L 9/3066* (2013.01); *H04L 9/3247* (2013.01); *H04L 9/50* (2022.05); *H04L 2209/56* (2013.01)

(56) References Cited

U.S. PATENT DOCUMENTS

| | | | |
|---|---|---|---|
| 2017/0221052 A1 | 8/2017 | Sheng et al. | |
| 2017/0223008 A1 | 8/2017 | Camenisch et al. | |
| 2017/0366347 A1* | 12/2017 | Smith | H04L 9/3247 |
| 2018/0285838 A1 | 10/2018 | Franaszek et al. | |

OTHER PUBLICATIONS

Ampersand et al., "[ANN] PassGuardian.com—Client-side threshold secret sharing," Bitcoin Forum, Feb. 11, 2013, https://bitcointalk.org/index.php?topic=142875.0, 3 pages.

Antonopoulos, "Mastering Bitcoin—Unlocking Digital Cryptocurrencies," O'Reilly Media, Inc., Dec. 20, 2014, 282 pages.

Ben-Abuya et al., "2-of-3 Paper Wallets," Bitcoin Forum, Jan. 29, 2013, https://bitcointalk.org/index.php?topic=139625.0, 16 pages.

Bitshares, "Delegated Proof-of-Stake Consensus," May 7, 2017, https://web.archive.org/web/20161102133058/https://bitshares.org/technology/delegated-proof-of-stake-consensus, 5 pages.

Castellucci et al., "Brainflayer," GitHub, Nov. 22, 2020, https://github.com/ryancdotorg/brainflayer, 5 pages.

Courtois, "Speed Optimizations in Bitcoin Key Recovery Attacks," Tatra Mountains Mathematical Publications—The Journal of Slovak Academy of Sciences 67(1):55-68, Jun. 22, 2016.

Dikshit et al., "Efficient weighted threshold ECDSA for securing bitcoin wallet," 2017 ISEA Asia Security and Privacy (ISEASP), http://ieeexplore.ieee.org/document/7976994/, Jan. 29, 2017, 10 pages.

Eskandari et al., "A first look at the usability of bitcoin key management," arXiv preprint arXiv:1802.04351, Feb. 12, 2018, https://arxiv.org/pdf/1802.04351.pdf, 10 pages.

Etotheipi et al., "[ANN] M-of-N "Fragmented Backups" now in Armory (command-line only)," Bitcoin Forum, Mar. 6, 2013, http://bitcointalk.org/index.php?topic=149820.0, 9 pages.

Extance, "Bitcoin and beyond," Nature 526(7571):21-23, Oct. 1, 2015.

Franco, "Understanding Bitcoin: Cryptography, Engineering and Economics," Wiley, ISBN: 978-1-119-01916-9, Oct. 2014, 144 pages.

Garzik, "[Bitcoin-development] Presenting a BIP for Shamir's Secret Sharing of Bitcoin private keys," Linux Foundation, https://lists.linuxfoundation.org/pipermail/bitcoin-dev/2014-March/004902.html, Mar. 29, 2014, 2 pages.

Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.

Hearn, Mike, "Client-side Threshold Private Key Sharing" Feb. 11, 2013, https://bitcointalk.org/index.php?topic=142875.0, 4 pages.

Ibrahim et al., "A robust threshold elliptic curve digital signature providing a new verifiable secret sharing scheme," 2003 IEEE 46th Midwest Symposium on Circuits and Systems 1:276-280, Dec. 30, 2003.

International Search Report and Written Opinion mailed Sep. 19, 2018, Patent Application No. PCT/IB2018/054104, 11 pages.

Jarecki et al., "Highly-Efficient and Composable Password-Protected Secret Sharing (Or: How to Protect Your Bitcoin Wallet Online)," IEEE European Symposium on Security and Privacy (EuroS&P), Mar. 21, 2016, https://eprint.iacr.org/2016/144.pdf, 16 pages.

Jarecki et al., "Round-Optimal Password-Protected Secret Sharing and T-PAKE in the Password-Only model," International Conference on the Theory and Application of Cryptology and Information Security, Dec. 7, 2014, https://eprint.iacr.org/2014/650.pdf, 44 pages.

Kokoris-Kogias et al., "Enhancing bitcoin security and performance with strong consistency via collective signing," 25th Usenix Security Symposium 2016, Aug. 10, 2016, 19 pages.

Madmat et al., "Best way to use Shamir's Secret Sharing Scheme," Bitcoin Forum, Apr. 11, 2014, https://bitcointalk.org/index.php?topic=566298.5, 2 pages.

Nakamoto, "Bitcoin: A Peer-to-Peer Electronic Cash System," Bitcoin, Oct. 31, 2008, https://bitcoin.org/bitcoin.pdf, 9 pages.

Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.

Satoshi et al., "Connection Limits," Bitcoin Forum, Aug. 9, 2010, https://bitcointalk.org/index.php?topic=741.0;prev_next=prev, 2 pages.

Stadler, "Publicly verifiable secret sharing," International Conference on the Theory and Applications of Cryptographic Techniques, May 12, 1996, https://link.springer.com/content/pdf/10.1007/3-540-68339-9_17.pdf, 10 pages.

Stathakopoulou et al., "Threshold Signatures for Blockchain Systems," IBM Research Report, Apr. 4, 2017, 42 pages.

Syta et al., Keeping Authorities Honest or Bust with Decentralized Witness Cosigning, 2016 IEEE Symposium on Security and Privacy, May 22, 2016, 20 pages.

UK Commercial Search Report mailed Sep. 29, 2017, Patent Application No. GB1709367.5, 8 pages.

UK IPO Search Report mailed Nov. 21, 2017, Patent Application No. GB1709367.5, 4 pages.

Zhao et al., "A Survey of Applications of Identity-Based Cryptography in Mobile Ad-Hoc Networks," IEEE Communications Surveys & Tutorials 14(2):380-400, Mar. 24, 2011, https://ieeexplore.ieee.org/document/5714975/.

\* cited by examiner

COMPUTER-IMPLEMENTED SYSTEM AND METHOD PROVIDING A DECENTRALISED PROTOCOL FOR THE RECOVERY OF CRYPTOGRAPHIC ASSETS

CROSS REFERENCE TO RELATED APPLICATIONS

This application is a continuation of U.S. patent application Ser. No. 17/833,391, filed Jun. 6, 2022, which is a continuation of U.S. patent application Ser. No. 16/622,275, filed Dec. 12, 2019, which is a 371 National Phase of International Patent Application No. PCT/IB2018/054104, filed Jun. 7, 2018, which claims priority to United Kingdom Patent Application No. 1709367.5, filed Jun. 13, 2017, the disclosures of which are incorporated herein by reference in their entirety.

FIELD OF INVENTION

This specification relates generally to a decentralised protocol for the recovery of cryptographic assets when private keys are lost. The invention is particularly suited, but not limited, to use with the Bitcoin blockchain.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated." Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e., added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing, etc.) while being more versatile in their applications.

One area of research is the use of the blockchain for the implementation of "smart contracts." These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

The following documents disclose background information relating to threshold signature schemes and backup methodologies for blockchain technology.

Pratyush Dikshit and Kunwar Singh ("Efficient weighted threshold ECDSA for securing bitcoin wallet", ISEA Asia Security and Privacy, 2017) disclose a threshold signature scheme for bitcoin wallets and more particularly a type of threshold signature scheme in which different groups of participants require different numbers of other participants in order to reach a threshold for the threshold signature scheme.

Goldfeder, et al. ("Securing Bitcoin wallets via a new DSA/ECDSA threshold signature scheme," 8 Mar. 2015) also describe a threshold signature scheme in which digital assets can only be accessed by a threshold number of members of a group of participants using a private key share scheme.

Two posts by user "etoheipi" on bitcointalk (29 Jan. 2013, topic 139625 and 9 Mar. 2013, topic 149820) relate to a scheme in which a hard paper back-up copy of a wallet can be split into a number of different fragments such that a user can reconstruct the wallet using a threshold number of the hard copy backup fragments if required to do so.

SUMMARY OF INVENTION

Recovery of cryptographic assets when private keys are lost is a famous unsolved problem in cryptographic currency. The lack of a secure and efficient decentralised mechanism by which this can be achieved is generally recognized to be one of the most significant barriers to widespread adoption.

The present specification relates to a method for enabling recovery of digital assets held on a blockchain by a user under a public key PK after a corresponding private key SK for accessing the digital assets is lost. The method involves setting access for the digital assets held on the blockchain under the public key PK and accessible using the corresponding private key SK of the user such that the digital assets are also accessible using a private key shared by a congress of users on the blockchain network utilising a threshold signature scheme. When the user loses their private key SK then they can notify the congress to access the digital assets on behalf of the user using the threshold signature scheme, the user proving their identity to the congress by providing a recovery password RPW.

According to one aspect as described herein there is provided a computer-implemented method for enabling recovery of one or more digital assets held on a blockchain under a public key Pk after a corresponding private key Sk for accessing the one or more digital assets is lost, the computer implemented method comprising:

setting access for the one or more digital assets held on the blockchain under the public key Pk and accessible using the corresponding private key Sk of the user such that the one or more digital assets are also accessible using a private key x shared by a congress on the blockchain network, the congress comprising a group of users on the blockchain network, each member of the congress having a private key share $x_i$, the private key share $x_i$ to be used in a threshold signature scheme in which at least a threshold of private key shares must be used to generate a valid signature through the combination of partial signatures of the congress to access the one or more digital assets on behalf of the user, whereby if the private key Sk is lost then the congress can be notified by the user to access the one or more digital assets using the threshold signature scheme on behalf of the user, the user proving their identity to the congress by providing a recovery password RPw.

The above methodology uses a threshold signature scheme in the form of a congress to recover assets. The difference between this method and a more standard multi-signature methodology is that an account is set up so that it can be accessed by a single user using their private key and is only accessed by the congress using their shared private key system on request by the user in the event that the user loses their private key and is unable to access their assets themselves. As such, multiple signatures are usually not required for the user to access their assets except in the instance when a user loses their private key. In such a circumstance, a congress can then be notified to access the account on behalf of the user. There is a level of security built into this system in that a consensus is required to access the assets on behalf of the user when requested to do so and on provision of the correct recovery password. That is, a threshold of members can confirm the validity of the user request before the assets can be accessed. As such, the system combines the ease of use of a single signature system with the security of a multi-signature system. The congress can be configured such that it will only use the private key share to generate and output a partial signature if a consensus on a decision to do so is observed.

Further levels of security and incentivisation can be provided to increase the robustness of the system to attack. For example, a recovery password can be set up which is used as part of a validity checking protocol for a user request to the congress to access the assets. The process to set up access to the digital assets can be initiated by a transaction T1 sent to the congress on the blockchain and indicating a desire to set up a recovery password for accessing one or more digital assets held under a public key Pk. A recovery deposit can be set which needs to be provided when an attempt to recover the one or more digital assets is made. In this regard, recovery deposit data can be provided in the transaction T1, e.g., in metadata of transaction T1. That is, a statement of the recovery deposit can be included in T1 as metadata. The recovery deposit can be retrieved if recovery is successful (less a recovery fee paid to members of the congress) but is lost if recovery is unsuccessful. The recovery deposit can thus be set to ensure that any attacker will be dissuaded from performing multiple attempts to access the account as they will lose a recovery deposit for each unsuccessful attempt.

The process to set up access to the digital assets can also include mapping of data associated with the recovery password RPw to data associated with the private key x shared by the congress on the blockchain network. The mapping can comprise combining data associated with the recovery password RPw with data associated with the private key x shared by the congress on the blockchain network. For example, the data associated with the recovery password RPw can be combined with the data associated with the private key x shared by the congress to construct a mapping from the recovery password onto the private key x shared by the congress, wherein the mapping itself reveals nothing about either the private key x shared by the congress or the recovery password RPw. The mapping can then be stored on the blockchain whereby information required to access the one or more digital assets is split between the mapping stored on the blockchain which is public and the private key shared by the congress which is private. Furthermore, the mapping saved on the blockchain is constructed such that the mapping itself reveals nothing about either the private key x shared by the congress or the recovery password RPw.

Using such a combining, mapping, and or recovery deposit procedure enables a recovery system in which the user can prove their identity to the congress by providing a password. This password can be of arbitrary low entropy (and thus easily memorisable) while the protocol remains secure (in particular, secure from a brute-force attack on the recovery password). For example, the recovery password RPw can have an entropy which is lower than that of the private key Sk and a 6, 5, 4, 3, or even 2 digit pin could suffice while the system remains secure (e.g., as long as the recovery deposit is fixed appropriately).

Examples of methodologies for achieving the aforementioned mapping from a recovery password to an existing secret quantity (the congress private key) can include one or more of the following steps:

encrypting data associated with each private key share with public key Pk associated with the one or more digital assets or concatenating the public key Pk with a hash of a block header;

wherein the data associated with each private key share comprises a quantity $g^{x_i}$, and each transaction containing the quantity $g^{x_i}$ is associated with a member of the congress;

checking to confirm that the quantities $g^{x_i}$ from each of the members of the congress are consistent;

once the quantities $g^{x_i}$ are checked to confirm that they are consistent, the following is constructed $$g^x = g^{\Sigma_i L_i x_i},$$

where $g^{x_i}$ is a point on an elliptic curve and $L_i$ are Lagrange coefficients; and performing an EXCLUSIVE OR (XOR) operation of the recovery password and the data associated with the private key shares to produce a mapping.

After producing a mapping, the mapping data can be signed using private key Sk and mined onto the proof-of-work blockchain on which the account resides. For example, the mapping data can be mined onto the proof-of-work blockchain by way of a transaction T2 which references public key Pk of the account.

The aforementioned procedures can be used to set up a recovery password. A computer implemented method is then provided for recovering one or more digital assets on a blockchain having access to a set up as previously described. The method comprises: accessing the one or more digital assets using the threshold signature scheme when the congress receives a transaction indicating a desire to recover the one or more digital assets by a user when they have lost their private key for accessing the assets. Note that it is assumed that this alternative method will only be used if the user has lost their private key, since it is a more expensive way to initiate transfer of the asset than the use of the private key Sk.

The transaction sent to the congress indicating the desire to recover the one or more digital assets can also identify a recovery public key. Accordingly, after accessing the account the one or more digital assets can be transferred to the recovery public key. Furthermore, the transaction sent to the congress indicating the desire to recover the one or more digital assets can also include a recovery deposit. As previously indicated, the recovery deposit can be retrieved if recovery is successful (less a recovery fee paid to members of the congress) but is lost if recovery is unsuccessful. The recovery deposit can thus be set to ensure that any attacker will be dissuaded from performing multiple attempts to access the account. For example, after receiving the transaction indicating the desire to recover the one or more digital assets, the congress can initiate a challenge period during which the congress monitors the blockchain for a veto transaction from the holder of the one or more digital assets. If a valid veto transaction is observed (i.e., a veto transaction signed by Sk) then recovery of the one or more digital assets is aborted and any recovery deposit is confiscated. If no valid veto transaction is observed, recovery can proceed by verifying that the data corresponding to the recovery password, data associated with the private key share, and the mapping data are all consistent. If consistent, the one or more digital assets in the account are recovered by the congress using their threshold key share system. If inconsistent, recovery of the one or more digital assets in the account is aborted and any recovery deposit is confiscated.

In one configuration, after the challenge period a second transaction is required to progress the recovery of the one or more digital assets. The second transaction sent to the congress for recovering assets can comprise data corresponding to the recovery password RPw. Recovery can proceed by verifying the data corresponding to the recovery password, if verified as correct the one or more digital assets are recovered, if incorrect recovery of the one or more digital assets is aborted and any recovery deposit is confiscated. The congress can initiate a temporary proof-of-stake blockchain (e.g., a so-called ghost-chain as discussed later) to verify the data corresponding to the recovery password.

The computer-implemented method as described herein can be implemented by providing a computer readable storage medium comprising computer-executable instructions which, when executed, configure a processor to perform the method as described herein. Furthermore, an electronic device can be provided comprising: an interface device; a processor coupled to the interface device; and a memory coupled to the processor, the memory having stored thereon computer executable instructions which, when executed, configure the processor to perform the method as described herein.

The invention as described herein is distinct over the prior art discussed in the background section as set out below.

Pratyush Dikshit and Kunwar Singh ("Efficient weighted threshold ECDSA for securing bitcoin wallet", ISEA Asia Security and Privacy, 2017) disclose a threshold signature scheme for bitcoin wallets and more particularly a type of threshold signature scheme in which different groups of participants require different numbers of other participants in order to reach the threshold for the threshold signature scheme. There is no disclosure or suggestion of setting access to digital assets held on a blockchain for a single user under a public key PK and accessible using a corresponding private key SK of a single user and only when the private key SK is lost then the user can notify a congress to utilise a threshold signature scheme to access the one or more digital assets on their behalf, the user providing proof of their entity to the congress by providing a recovery password RPW.

Goldfeder et al. ("Securing Bitcoin wallets via a new DSA/ECDSA threshold signature scheme," 8 Mar. 2015) also describe a threshold signature scheme in which digital assets can only be accessed by a threshold number of members of a group of participants using a private key share scheme. Again, there is no disclosure or suggestions of providing a single-access account with an associated public and private key and that a threshold signature scheme is only utilised when the private key is lost and the congress is notified by the user to access the digital assets using the threshold signature scheme on behalf of the user, with the user proving their identity to the congress by providing a recovery password RPW.

Both the aforementioned documents are directed to threshold signature schemes where the threshold signature scheme is always utilised to access assets and requires signatures from a threshold number of users on the Blockchain network. Such threshold signature schemes are known in the art and are useful for increasing security and preventing a single user from accessing and moving digital assets. Such a scheme also has the additional effect that if a single member of a group of users loses their private key then the digital assets can still be access by a threshold number of the remaining users. However, such a configuration has the disadvantage that a number of users are always required to access the digital assets and thus this system is inconvenient for a single user who wishes to set up a system in which they themselves can access the digital assets without requiring any other users but where the user still requires a means by which they can access their digital assets in the event that they lose their private key. The present invention addresses this problem of private key loss by utilising a threshold signature scheme as a means of recovering the assets in the event of a loss of private key of an individual user verifying their identity by way of a recovery password.

Two posts by user "etoheipi" on bitcointalk (29 Jan. 2013, topic 139625 and 9 Mar. 2013, topic 149820) relate to a scheme in which a hard paper back-up copy of a wallet can be split into a number of different fragments such that a user can reconstruct the wallet using a threshold number of the hard copy backup fragments if required to do so. Neither of these disclosures relates to the use of a congress comprising a group of users on the block chain network, each member of the congress having a key share for use in a threshold signature scheme. There is no disclosure or suggestion that when a user loses their private key they can notify the members of the congress to utilise a threshold signature scheme in order to access digital assets on behalf of the user, with the user proving their identity to the congress by providing a recovery password RPW. These two posts do relate to the problem of a single user losing access to their digital assets. A prior art method of providing a back-up system is in the form of a printed paper copy of the private digital key. However, if such a paper copy is stolen then this presents a security risk. The methodology as described in these posts provides a solution in which the back-up copy is split into a plurality of fragments by the user which can be reconstructed by the user. This is a different solution to that provided in the present specification which instead utilises a threshold signature scheme involving a plurality of users on the blockchain network.

BRIEF DESCRIPTION OF THE DRAWINGS

These and other aspects of the present invention will be apparent from and elucidated with reference to, the embodiments described herein. Embodiments of the present invention will now be described, by way of example only, with reference to the accompany drawings, in which.

DETAILED DESCRIPTION

Overview

It has been estimated that more than 2700 Bitcoin have been effectively lost due to hard drive crashes or private key loss [https://www.cryptocoinsnews.com/thousands-bit-coins-lost-time/]. Once the credentials are lost, the coins, which may be worth billions of dollars, are locked in unusable wallets.

The use of memorable passwords for wallet recovery seemed to be a viable and more efficient route to be undertaken. The so-called brainwallets make use of simple passwords, which can be memorised in the user's 'brain', to recover funds in case of loss of the private key. Nonetheless, hackers and researchers proved that brute-force attacks to recover the password and steal the funds are relatively easy to carry out.

The key stretching technique, which uses a difficult-to-optimise hash function multiple times to derive a private key from a simple password, helps to make the attack more computationally expensive but does not guarantee security into the future. Indeed, new hardware with increased computing power may be produced, hence making the computational challenge more affordable in terms of costs and feasibility. Moreover, any appreciation of the value (in terms of fiat, assuming computer time is priced in fiat) of the funds in the account renders a stretched key less secure, since the pay-off if it is cracked becomes a larger multiple of the investment required to crack it.

This specification presents the first fully-trustless solution for recovering funds in the event of lost private keys, which maintains a constant level of security against brute force hacking attacks. We are interested in the particular case of users who have lost the ability to authorise the transfer of their funds through 'regular means' (more precisely, have lost control of their private key), and want to recover these funds. Our solution takes advantage of the Congresses and Ghost Chains protocol to effectively replace the computational cost of key-stretching with a consensus-imposed cost, which is only levied when an attempt to recover funds is unsuccessful.

The security and the functioning of cryptocurrency operations are, strongly dependent on secure private key storage and preservation. The major issues are the theft or loss of a user private key. The inability to recover lost passwords, private keys or funds is cited as a significant barrier to wide-spread adoption of cryptographic currency [Extance, A. (2015). Bitcoin and beyond Nature, 526(7571), 21. http://www.nature.com/polopoly_fs/1.18447!/menu/main/topColumns/topLeftColumn/pdf/526 021a.pdf]. Indeed, losing a Bitcoin private key may seem superficially similar to the loss of an online banking password. There are at least two important differences, however: (i) while in the banking system transactions are traceable and reversible and stolen funds can potentially be recovered by reversing fraudulent transactions [Eskandari, S., Barrera, D., Stobert, E., & Clark, J. (2015, February). A first look at the usability of bitcoin key management. In Workshop on Usable Security (USEC). https://users.encs.concordia.ca/~clark/papers/2015_usec.pdf], this is clearly not possible with cryptocurrency, such as Bitcoin, as transactions are irreversible and there is no central authority to arbitrate in the event of fraud; (ii) banking passwords can be recovered in return for the user proving their identity to the bank. This specification offers a solution equivalent to (ii) for cryptographic systems (particularly consensus-based distributed ledgers).

To address these concerns different solutions have been proposed: users can choose among various types of wallets such as Web Wallets providing key management services or store their private keys using cold storage, i.e. placing their keys in a location that it is not accessible from the internet. However, these services require that trust is placed in the provider [Antonopoulos, A. M. (2014). Mastering Bitcoin: unlocking digital cryptocurrencies. O'Reilly Media, Inc.; http://www.coindesk.com/information/how-to-store-your-bitcoins/].

In the event of a lost password, online services, offering password recovery services such as Wallet Recovery Service [http://www.coindesk.com/meet-man-will-hack-long-lost-bitcoin-wallet-money/] have, in general, a low success rate, around 30%, depending on the information provided by the users; the fee charged for this service, in case of successful recovery, is up to 20% of the value of the wallet. Note that such services can only be effective in the case that an account holder retains the encryption of their private key but have lost the password required to decrypt it.

Particularly intriguing is the idea of brainwallets [https://blog.ethereum.org/2014/10/23/information-theoretic-account-secure-brainwallets/], whereby a private key is generated by hashing a sufficiently long password or passphrase directly created by the user [Franco, P. (2014). Understanding Bitcoin: Cryptography, engineering and economics. John Wiley & Sons]. This solutions tries to solve the key storage issue, as the password does not need to be stored in the wallet itself but it can be kept in the 'user's brain.' Online platforms, such as https://brainwallet.io/, https://paper.dash.org/ etc., can easily generate deterministic cryptocurrencies addresses given a password/passphrase and some salt, i.e., random data that is used as an additional input to the hashing one-way function.

Brainwallets' passwords must be secure and memorable at the same time: security is based on the time needed by an attacker to crack the password while memorability relies on the amount of information that must be remembered. Clearly, the two aspects are negatively correlated, and depend on the entropy of the chosen password [Franco, P. (2014). Understanding Bitcoin: Cryptography, engineering and economics. John Wiley & Sons].

One of the main problems with these types of wallets is surely the high incentive to try to crack the passwords, as this would give the attacker full access to the funds locked in the wallet itself. Attackers use brute force cracking algorithms that try many passwords and check if the generated address exists and contains funds: with the current technology, chips can perform around $2^{36}$ attempts per second. In [Courtois, N., Song, G., & Castellucci, R. (2016). Speed Optimizations in Bitcoin Key Recovery Attacks. IACR Cryptology ePrint Archive, 2016, 103. https://eprint.iacr.org/2016/103.pdf; https://github.com/ryancdotorg/brainflayer] it has been shown that brainwallets are not secure even if complex passwords are employed and new and faster algorithms, which scan the blockchain for weak keys have been made available: the attack presented managed to find 16,250 password per second on each thread and cracked more than 18,000 brain wallet addresses. Moreover, as mentioned above, cracking of brainwallets becomes easier over time as hardware improves, as well as more profitable assuming the appreciation of the value of cryptographic assets (which has been extremely substantial in the case of all leading cryptocurrencies to date).

Moreover, recently millions of real world leaked passwords have been made available to hackers that can use them to reconstruct users' habits and design faster algorithms [https://arstechnica.com/security/2012/08/passwords-under-assault/].

A possible further weakness may occur when brainwallet addresses, derived from the same password, are stored on the blockchain as part of the transaction script. Guessing passwords when multiple addresses are derived from the same seed then becomes easier.

To reduce the chances to reverse engineer the system, still keeping the password's entropy low, one option consists in using a hard key derivation function. This process, also called key stretching is based on repeated application of a difficult-to-optimise hash function such as SHA256, SHA1, etc. several times in a row, generally around a 1000 times [https://en.wikipedia.org/wiki/Key_stretching]. In this way, checking individual password takes longer, and is more costly, hence increasing the attacker workload. However, these solutions appear to be inadequate since they are not future-proof.

Assuming that a personal computer can perform around 6500 SHA-1 hashes per second, one can easily show that the key stretching solution quickly becomes insecure. A key stretching program can use 6500 rounds of hashes and delay the user for about one second. From the attacker's point of view, as any regular password testing typically requires one hash operation, using the key stretching increases his workload by a factor $2^{16}$ (equivalent to extra 16 bits of entropy added to the regular password). According to Moore's law, the computer performance in terms of speed is supposed to double every 1.5 years, meaning that possibly one more bit of key strength every 1.5 years may become easily determined. To maintain a constant level of security, the key stretching rounds should be doubled every 1.5 years but this would require: (i) a higher computational cost for the user to perform the key stretching; (ii) the designer of the key stretching algorithm should take this aspect into consideration and decide the lifespan of the system. Blockchain miners can also be used to perform the computational tasks of the key stretching process 'while they mine', thereby incurring almost no extra cost; moreover, this can be done without revealing the user's password to the miner [https://en.wikipedia.org/wiki/Key_stretching]. However, such an arrangement would also permit miners to attempt to brute-force user's passwords 'for free', which defeats the entire objective of key stretching.

In addition, an increase in the cryptocurrency appreciation may constitute a further, more difficult to predict, incentive for brainwallet password brute forcing and a serious threat to the wallet's security.

The solution proposed in this specification does not rely on key stretching techniques but uses a consensus mechanism for the user's password retrieval: upon the user's request and payment of a recovery deposit (from which a fee may be deducted in the case of successful recovery), members of a congress can validate the request and unlock the funds and move them to a new address, whose private key is known by the requester.

Before discussing details of the decentralized protocol for recovery of cryptographic assets when private keys are lost, congress and ghost chain protocols are described as these protocols are used in configurations of the cryptographic asset recovery protocol described herein.

Congresses

A congress may be formed on a blockchain network. A congress is an open-membership group which may be joined by any node in the blockchain network upon submission of sufficient stake to a pool associated with the congress. For example, a node may join a congress through transfer of a digital asset, such as digital currency (such as bitcoin), tokens or other stake or value, to a resource (e.g. an account) associated with the congress. The congress may be secured, in part, through distributed generation of private key shares. Each private key share may be used by its holder to generate a partial signature for a transaction. A threshold signature scheme may be used to generate a valid signature for such a transaction using at least a threshold of partial signatures. The member deposit is subject to confiscation for malicious behaviour.

Through the use of distributed generation of key shares and other security features, key shares are secured to prevent malicious activity by group members or non-group members. Such security, coupled with the use of a threshold signature scheme, allows a self-governing, decentralized group to be formed and the group may be used for any one of a number of purposes. More particularly, the threshold signature scheme allows the group to control digital assets encumbered by a public key associated with the group. In the present specification such a congress group is used in a decentralized protocol for recovery of cryptographic assets when private keys are lost.

A congress can be formed in the following manner: (i) broadcasting, by a node in a blockchain network, a transaction to transfer one or more digital assets to a public group address associated with a congress public key, the public group address being associated with one or more other digital assets associated with other members of a congress; (ii) generating a private key share to be used in a threshold signature scheme in which at least a threshold of private key shares must be used to generate a valid signature through the combination of partial signatures on behalf of the congress, and wherein other holders of the private key shares are the other members of the congress who have joined the congress by transfer of respective digital assets to the public group address; and (iii) using the private key share to cooperatively generate a valid signature for a transaction from the public group address.

In some implementations, the threshold signature scheme is an Elliptic Curve Digital Signature Algorithm.

In some implementations, the computer-implemented method may further include: (i) detecting malicious activity by a malicious party, wherein the malicious party is one of the other members of the congress; and (ii) confiscating at least a portion of digital assets previously transferred to the public group address by the malicious party.

In some implementations, the computer-implemented method may further include: (i) detecting a redistribution request; (ii) collaborating with other congress members to transfer all digital assets in the public group address to a new public address associated with a new public key; and (iii) generating a new private key share.

Notable Features of a Congress:
- A shared public key, which we call the Congress public key (CPK).
- The requirement for funds to be deposited and placed under the control of a threshold signature means that a Congress can form a self-governing group, where cooperative behaviour is enforced through the threat of confiscation of all or part of the deposits of any subgroup of non-cooperative (or, indeed, malicious) members, by a threshold of honest members.
- Distributed generation of private keys is a crucial feature of a Congress, since the objective is to create a self-governing, decentralised entity.
- Leaving a Congress is accompanied by withdrawal of funds, which must be authorised by a threshold of current members. Joining a Congress may or may not require the consent of the current membership, depending on the specific implementation.

Ghost Chains

Ghost chains are typically blockchains for arbitration (e.g., dispute resolution). For example, for the current application, a node claims that they are the owner of an account by issuing a recovery request, and offers evidence in the form of RPw. This evidence must be assessed by the congress, which can be construed as an arbitration. The validity of the recovery request and/or the RPw may or may not be disputed.

Ghost chains exist only temporarily, being deployed in response to a dispute on a parent blockchain (the parent); the Ghost chain (the ghost) requests various evidence from the parties involved, arbitrates according to a fixed set of criteria, and distributes funds on the parent accordingly. Once the result of the dispute is committed to the main chain (together with, optionally, the Merkle root hash of the intermediate computational states), the ghost shuts down. Ghost chains can be secured by proof-of-stake (POS). This is a more suitable security model for ghost chains than proof-of-work (POW) since POS allows for higher frequency blockchains with more predictable block times than POW which makes the process of gathering evidence much more efficient.

A ghost chain can be implemented in the following manner: (i) joining, by a node, a group through deposit of digital assets to a public group address to become a group member (i.e., a member of a congress), the group being associated with a threshold signature scheme for which the node controls a private key share, the deposit of digital assets being made on a proof-of-work blockchain network; and (ii) cooperating, by the node, with other nodes of the group. For example, cooperation may involve detecting a request which requires arbitration, deploying a ghost chain to resolve the arbitration request, the ghost chain being a proof-of-stake blockchain in which miners of the ghost chain are members of the group, and terminating the ghost chain upon resolution of the arbitration.

The ghost chain may thus be a temporary blockchain which, in contrast to a traditional blockchain, may be configured to terminate, disappear and/or expire upon performance or satisfaction of one or more criteria, goal or designated purpose. That is, the ghost chain may be a single-purpose blockchain which ceases to exist once its purpose has been achieved.

The present specification describes how congresses and ghost chains can be combined in order to provide a decentralized protocol for recovery of cryptographic assets when private keys are lost.

Locking Funds with a Recovery Password

Imagine that Alice wants to place some cryptographic assets in an account with signing (private) key Sk. She is worried that she may lose the signing key Sk, and so would like an alternative method to recover the funds, should a disaster strike. In this section, we explain how Alice may configure her account such that her funds can be recovered, in return for a (potentially) small fee, by providing a recovery password (RPw), which can be simple enough to memorise. The fee will be determined by the market, more specifically the market rate to pay miners of a ghost chain (the reader is referred to the concept of 'gas' in Ethereum for more detail on the market pricing of computational steps in a consensus protocol: https://ethereum.gitbooks.io/frontier-guide/content/costs.html). As we shall see, Alice's account may be considered secure even when a very simple recovery password RPw is chosen, so long as a sufficiently large deposit is required when an attempt to recover funds is made, most of which can be potentially recovered (depending on the fee)if the recovery of the password RPw is successful.

In this specification, implementation of congress and ghost chain protocols includes the following:
- Members of a congress hold security deposits on a proof-of-work (POW) blockchain M (on which Alice's account resides). In return for, and in proportion to, these deposits, they receive one or more shares in a private key.
- Members of a congress mine a proof-of-stake (POS) alt-chain A. For example, alt-chain A can be a ghost chain.
- There exists a static congress public key (CPK) and members i of the congress hold shares $x_i$ in the corresponding private key x, within Trusted Execution Environments (TEEs), such that the $x_i$ are not directly accessible to the members. The TEEs are configured so that they will not output any quantity which may reveal information about $x_i$.
- A TEE will only output a quantity derived from $x_i$ (such as a partial signature) when it observes consensus on A that it should do so.

We denote a public key by Pk and the corresponding signing key by Sk. Let G be a cyclic group, of large prime order in which the discrete logarithm problem is hard. Let $H_1:\{0,1\}^* \to G$ and $H_2:\{0,1\}^* \to \{0,1\}^i$, $i \in \Sigma$ be collision-resistant hash functions, which are assumed computationally infeasible to invert. Let $\oplus$ denote the XOR operation between two binary strings (bit-wise, mod 2 addition), and let ○ denote concatenation.

The Protocol

In this section we describe the main steps of the recovery password's set-up and asset recovery phase. We also describe the password reset procedure. Security arguments are deferred to a later section.

Set-Up:
1. Alice sends funds, using a special transaction T1, which signals to the congress her desire to set a RPw for the account The output of T1 may be spent by (i) Alice, locked under Pk, or (ii) the congress, locked under CPK. This transaction states the recovery deposit ($r_d$) amount that needs to be provided when an attempt to recover the assets is made. Let us say that T1 is mined into the M-block $B_n$. Unless otherwise stated, we will store any relevant information or reference to other transactions as metadata.
2. Members of the congress each secretly send (encrypted with Pk) a quantity $g^{x_i}$ to Alice, where $G \ni g \equiv g(m) := H_1(B_m \circ Pk)$ and $m > n$ is fixed by convention. Of course Pk could just as well be concatenated with the hash of the block header of $B_m$, for example. Each of the transactions containing the $g^{x_i}$ are to be associated with the share ID of the individual TEE belonging to the member, and signed by the corresponding private key. Certain blinded quantities are also included in the transaction, so that the consistency of the $x_i$ can be verified.
3. Once Alice is satisfied that the quantities she has received from the members are consistent, she constructs $$g^x = g^{\Sigma_i L_i x_i},$$

where $L_i$ are the appropriate Lagrange coefficients. The consistency check can be carried out using the Verifiable Secret Sharing protocol [https://en.wikipedia.org/wiki/Verifiable_secret_sharing] or the Publicly Verifiable version of the protocol [Stadler, M. (1996, May). Publicly verifiable secret sharing. In International Conference on the Theory and Applications of Cryptographic Techniques (pp. 190-199). Springer Berlin Heidelberg. ftp://ftp.inf.ethz.ch/pub/crypto/publications/Stadle96.pdf]. The protocols can be used to: i) identify inconsistent shares; and ii) check whether a share 'secretly sent' to a party differs from the blinded share which is broadcast.
4. Alice, now takes a binary representation (ASCII) of her RPw and pads it thus so that the length of the padded string equals that of $g^x$, for example, by concatenating a one followed by zeros: RPw→RPw○100 . . . 00. Alice then XORs the 'padded password' with $g^x$. This XOR: =RPw⊕$g^x$(m) is signed by Sk, and mined into M by way of a flagged transaction T2, which references Pk. Alice's RPw is now set. $g^x$ is a point on an EC, and therefore has two coordinates. There are various ways to convert $g^x$ to a binary string, which is a function of both coordinates. Perhaps the simplest way to do this would be to hash the concatenation of both coordinates, in symbols: $g^x \to H_2(g_x^x \circ g_y^x)$, where $g_{x,y}^x$ denote x, y components of $g^x$. We invoke a slight abuse of notation throughout the papers in that any point on an EC is assumed to have been converted to a binary string whenever this is obviously implied by context.

Asset Recovery:
1. If Alice loses Sk, she can use RPw to recover her funds as follows: Alice broadcasts a pre-recovery transaction (PRT), which references T1, and sends the required recovery deposit to the CPK. The PRT contains: (i) $H_2$(RPw○RPk), where RPw denotes the recovery public key, which should be a newly-generated public key known only to Alice (at this stage); and (ii) a statement of the recovery fee ($r_f$) offered to miners of the ghost chain A in return for executing the recovery protocol ($r_f$ is deducted from $r_d$). The funds will be relocked under the RPk if recovery is successful and $r_d$-$r_f$ retuned to Alice. The transaction is signed by the Deposit Signing Key (DSk), corresponding to the public key DPk of the account from which the deposit is paid.
2. In response to observing a PRT, with the correct deposit, and offering a recovery fee which they deem sufficient, the congress initiates a challenge period, lasting a fixed number of blocks. During the challenge period, the congress monitors M for: (i) further PRTs, attempting to recover the same account; and (ii) the mining of a veto transaction, signed by Sk. If a veto transaction is observed, the recovery protocol is aborted and the recovery deposit, associated with the PRT, is confiscated.
3. If no validly signed veto transaction is observed during the challenge period, the congress instantiates a ghost chain. Any party who had previously sent a PRT may now send a recovery transaction RT, referencing a PRT, to the ghost chain. The RT should contain: (i) the RPw; and (ii) the RPk and be signed by DSk. Verifiers must now check that RPw○RPk hashes to the value in the referenced PRT: if it does not, the recovery deposit associated with this PRT is confiscated, the recovery fee is deducted and any remaining deposit burned.
4. If there is an RT for which the hash of RPw○RPk atches the value in the corresponding PRT, members of the congress broadcast the $g^{x_i}$(m). Now, anyone can reconstruct $g^x$(m), and attempt the verification: XOR⊕$g^x$(m) $\stackrel{?}{=}$ RPw. If verification: (i) succeeds, funds are relocked under RPk by the congress (optionally, with a recovery mechanism), the recovery fee is deducted from the deposit and the remainder of the deposit is returned to Alice; or (ii) fails, the RPw must be reset. Reset is required since the true RPw is revealed in the process of checking. Note, however, that we would not expect an attempt at guessing RPw to ever make it to this stage, since the owner of the account would issue a veto transaction during the challenge period if they became aware of a fraudulent attempt to recover funds. Thus, assuming a timely response, reset should be unnecessary.

RPw reset: Alice must select a new RPw. The congress and Alice repeat steps 2-4 of the set-up phase, except with $g(m) \to g(m') = H(B_{m'} \circ Pk)$, m'>m, where $B_{m'}$ is a generally-agreed-upon M-block ($B_{m'}$ could just as well be an A-block, or a hash thereof; the point is, it must be a random quantity that cannot be predicted before the request to set a recovery password is made), mined some time after it is established that the recovery-attempt has failed (i.e. XOR⊕$g^x$(m)

$\stackrel{?}{=}$ RPw has failed to verify). The RPw is now reset. The fees for this process are deducted from the deposit associated with the PRT which precipitated the reset. Any remaining deposit is burned. Note that this implies there should be a lower bound to the recovery deposit, which is the cost of performing a reset.

Comment: Assets may be spent from, and deposit to, the account while maintaining the recovery facility. When this happens recovery deposit $r_d$ can also be changed (which is necessary to maintain a constant level of security). Any UTXO which pays to 'Pk or CPK' can be recovered. These transactions also reference T2, to signal that a password has already been set-up by the Congress for Pk. If these UTXO have different $r_d$'s, the largest $r_d$ is chosen. So for example, Alice can make a payment from her account and by spending all UTXO locked under Pk, and returning the 'change' to a UTXO which pays to 'Pk or CPK', and, in general, states a different $r_d$ (presumably, this would be a lower $r_d$). If Alice wishes to add assets to her account, she sends these assets via a transaction with output paying to 'Pk or CPK'; this transaction may specify an increased $r_d$, which will then apply to all assets in her account.

Design Choices and Security of Protocol

A key objective is to utilise the properties of a congress while avoiding placing a substantial additional burden on the members. The congress private key is a secret stored in the 'collective memory' of the members, such that shares in the secret are reallocated and deleted as members join and leave. This idea is to derive a 'mapping' (the XOR) from the RPw to the secret x (more precisely, a quantity derived from x, using a one-way function), and store this mapping in the blockchain. In this way, the information required to reconstruct RPw is effectively spit between XOR (which is public) and x (which is private) and in such a way that no information about RPw can be obtained from the public part. This approach means that there is no need for members to store any additional secret information within their TEEs—the only requirement is to retain a collective memory of x, which is done anyway.

Comments on security of the various steps of the protocol:
Set-Up:
1. The recovery deposit can be stated as a proportion of the total funds in the account and should be large enough so that it is uneconomic (that is, the expected return from guessing should be negative) for an attacker to attempt to guess RPw. Note that (in sharp contrast to the key-stretching technique described in the introduction) this renders our scheme entirely future proof, since the entropy of a given RPw and the recovery deposit (as a proportion of the total funds), do not change over time. Future-proofing also demands that the recovery fee should be offered with the PRT rather than at an earlier stage.
2. Associating a member's identity with the $g^{x_i}$ means that they can receive remuneration for providing this service.
3. Moreover, it also means that they can be financially penalised if they were shown to be providing inconsistent $g^{x_i}$.
4. Presuming $g^x$ to be random, XOR:=RPw$\oplus g^x$(m) is random. In particular, no information about RPw can be derived from XOR without knowledge of $g^x$. Note that the length of RPw is blinded by the process of padding.

Figure 1:
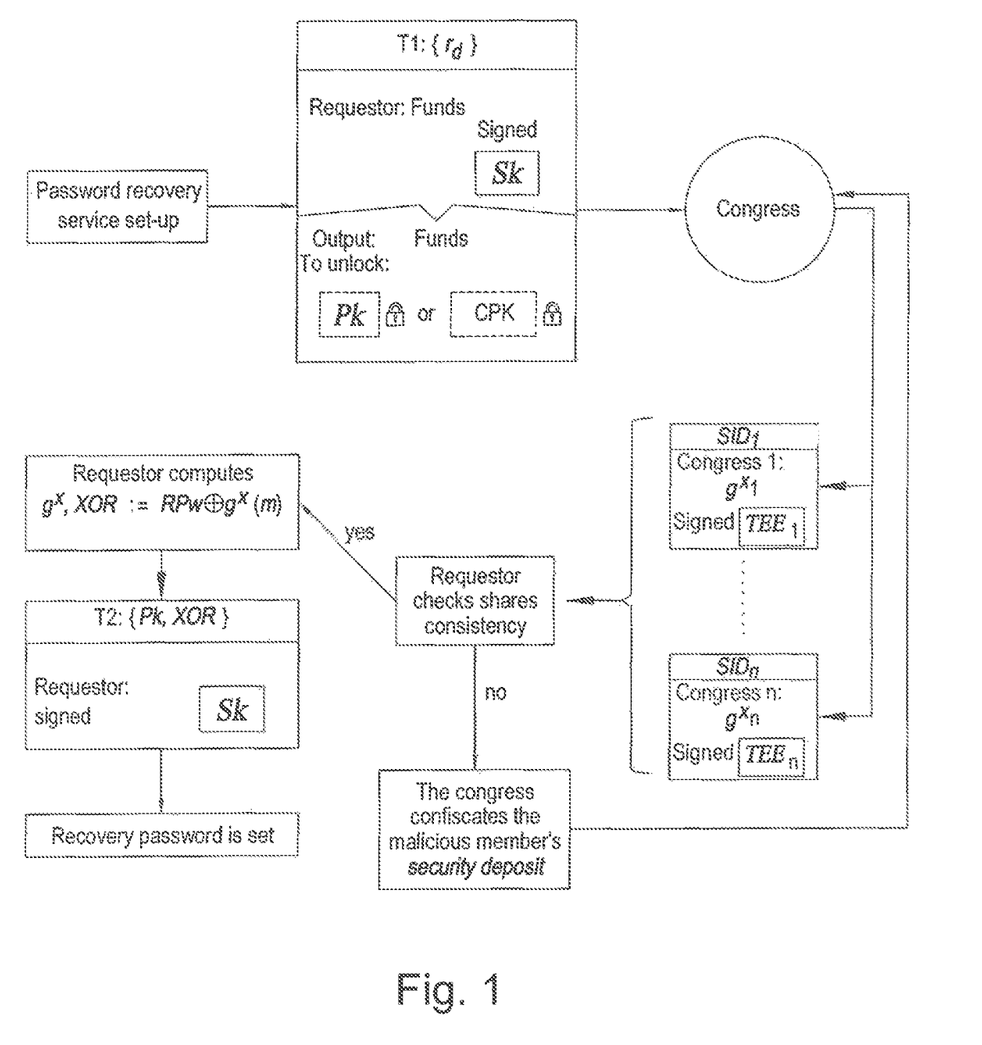
FIG. 1 shows a scheme for a password set-up procedure.

FIG. 1 shows a scheme of the password set-up procedure. The password set-up process is initiated by the requestor by sending T1, to lock the funds under the congress public key (CPK) and the requestor's Pk. Members of the congress, then, send encrypted shares derived from their private key that allow the requestor to compute $g^x$, XOR it with his/her chosen password RPw and broadcast the result in T2.

Asset recovery:
1. $H_2$(RPw$\circ$RPk) commits to both RPw and RPk. Moreover, neither can be backed out of the hash, even for very low entropy RPw, assuming RPk is (at this stage) known only to Alice, and is of typical entropy (effectively random, and sufficiently long). The recovery fee offered is stated at this stage, and may vary depending of the current market rate for computations.
2. We must allow for the possibility that an adversary could 'front-run' transactions, stripping out certain information, and using this to construct a malicious transaction which may be mined first. For example, this would be achievable by a large miner with appreciable probability. For this reason, after the first PRT is observed, we must allow time for other PRTs to be mined, since there is no way to tell at this stage which are genuine. Recall that (assuming one of them is genuine, i.e., Sk has indeed been lost) Alice cannot construct a valid veto transaction.
3. An RT will only be considered if it corresponds to a confirmed PRT, which commits to a RPw and RPk, and must contain a recovery deposit, all of which will be lost if verification fails. An attacker has no way of gaining information about RPw at the time the PRTs are mined. Hence the protocol is secure so long as the recovery deposit is sufficiently large compared to the quantity of assets to be recovered and the entropy of RPw.
4. The final step in a verification or attempted verification of RPw result in the true RPw being revealed.

RPw reset: Since the true RPw is revealed in the process of checking. Note, however, that, assuming a timely response with a veto transaction by Alice, we would not expect an attempt at guessing RPw to make it to this stage. That an account holder can monitor the M and respond in a timely fashion to an attempted theft is a common assumption in the cryptocurrency space. An example is issuance of a *Breach Remedy Transaction in the Lightning Network* [J. Poon, T. Dryja. The Bitcoin Lightning Network: Scalable Off-Chain Instant Payments, (Draft version 0.5.9.2). Available online: https://lightning.network/lightning-network-paper.pdf]. However, in contrast to the situation in the Lightning Network (were all funds in the account can be lost), the consequences for our protocol of failing to respond in time are rather mild—a RPw reset.

Figure 2:
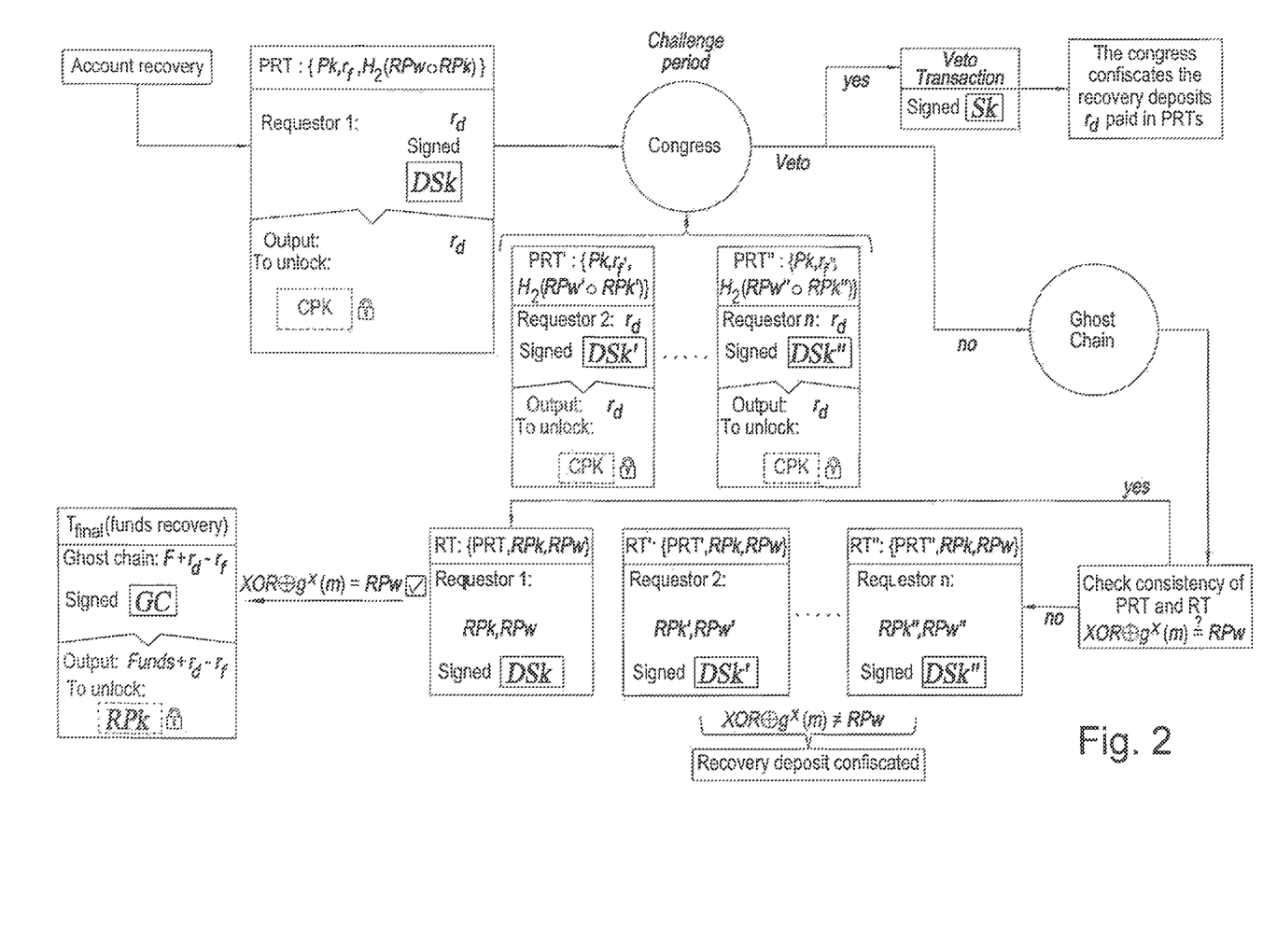
FIG. 2 shows a scheme for a password recovery protocol.

FIG. 2 shows a scheme of the password recovery protocol. It consists of two phases: the pre-recovery and recovery phase. During the pre-recovery, password recovery requests are received by the congress. Within the so-called challenge period the congress also monitor whether a veto transaction has been submitted by the owner of the wallet to stop the procedure. If no veto is submitted, a ghost chain is initiated, recovery transactions are submitted by the requesters and are checked for consistency (as detailed in the asset recovery protocol description). In case of success, funds are transferred to a new address, controlled by the requester. Fraudulent attempts will instead incur in the deposit's confiscation.

Password Security

The password's strength is generally measured as the expected number of computational steps needed by an attacker to be able to guess the password. For randomly generated passwords one generally uses, as mentioned before, brute force attacks, trying all possible combination of characters of a certain length. This means that, given a password of length L composed of n characters, the attacker will find the correct password in $n^L$ steps.

In our solution we associate a cost per failed attempt, the so-called recovery deposit, which may be stated as a percentage of the funds stored in the address. In this way, there is a substantial disincentive to try to perform the attack.

For instance one could consider a password of length L=3 using the Arabic numerals as symbols set, i.e. n=10, and deposit $r_d$=0.01*F, where F is the amount of funds available in the wallet derived from the password. To crack the password, the attacker is expected to perform $10^3$ attempts, which would cost the attacker on average $10^3*0.01*F=10F$, ten times the funds stored in the account. Increasing the recovery deposit, hence, corresponds to discouraging random attempts from malicious attackers and increasing the wallet security. Note that the security of the scheme remains constant even as the computational cost of producing a password permutation and the values of the associated cryptographic assets change.

In our protocol, it is even more complicated for the attacker to estimate the number of attempts needed to crack a password and the calculation shown above may be useful to calculate a lower bound of the costs associated to the attack. Indeed, thanks to the 'padding procedure' described in the set-up phase (point 4), whereby the binary representation of RPw is padded by concatenating a one followed by zeros to equal the length of $g^x$, the attacker would not know the exact length of the chosen password. Hence, the attacker would have to repeat on average $n^L$ for every L=1, . . . , length($g^x$), until the effective length and the password itself are found.

Summary and Conclusion

We have presented the first fully-trustless solution for recovering funds in the event of lost private keys, which maintains a constant level of security against brute force hacking attacks.

Because the RPw is revealed in our scheme when funds are recovered, it is suitable only in the case of 'rare events' such as loss of private keys. It would be unsuitable, for example, for use as a routine method of authorising transactions, since it incurs relatively high fees, and the password would need to be reset each time (meaning that: (i) it is more likely to be forgotten; and (ii) any patterns if password selection could potentially be identified).

Another shortcoming is that full-security requires an account owner to monitor the blockchain for attempts to fraudulently recovery the funds, and respond (with a veto transaction) within a challenge period. However, the result of failure to do this is, most likely, a password reset (as opposed to, for example, loss of funds).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises," and the like, does not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method for enabling recovery of one or more digital assets held on a blockchain by a user under a public key Pk after a corresponding private key Sk for accessing the one or more digital assets is lost, the computer implemented method comprising:
   setting access for the one or more digital assets held on the blockchain under the public key Pk and accessible using the corresponding private key Sk of the user such that the one or more digital assets are also accessible using a private key x shared by a congress on a blockchain network, the congress comprising a group of users on the blockchain network, each member of the congress having a private key share xi, the private key share xi to be used in a threshold signature scheme in which at least a threshold of private key shares must be used to generate a valid signature through a combination of partial signatures of the congress to access the one or more digital assets on behalf of the user, wherein setting access is initiated by a transaction Tl sent to the congress on the blockchain network indicating a desire to set up the recovery password RPw for accessing one or more digital assets held under the public key Pk, and wherein setting access comprises mapping data associated with the recovery password RPw to data associated with the private key x shared by the congress on the blockchain network, wherein the transaction Tl comprises metadata comprising recovery deposit data configured to request a recovery deposit upon a recovery attempt;
   notifying, in response to the private key Sk being lost, the congress by the user to access the one or more digital assets using the threshold signature scheme on behalf of the user, the user proving their identity to the congress by providing the recovery password RPw and by providing a recovery deposit
   detecting malicious activity by a malicious party in a congress, wherein the malicious party is one of the other members of the congress; and
   confiscating at least a portion of digital assets previously transferred to the public group address by the malicious party.

2. The computer-implemented method according to claim 1, wherein the recovery password RPw is a digital pin code of no more than six digits.

3. The computer-implemented method according to claim 1, further comprising storing the mapping data on the blockchain whereby information required to access the one or more digital assets is split between the mapping data stored on the blockchain that is public and the private key shared by the congress that is private.

4. The computer-implemented method according to claim 1, wherein the mapping data comprises a combination of data associated with the recovery password RPw and data associated with the private key x shared by the congress on the blockchain network.

5. The computer-implemented method according to claim 4, wherein the data associated with the recovery password RPw is combined with the data associated with the private key x shared by the congress to construct a mapping from the recovery password onto the private key x shared by the congress, wherein the mapping itself reveals nothing about either the private key x shared by the congress or the recovery password RPw.

6. The computer-implemented method according to claim 5, wherein the data associated with each private key share is encrypted with public key Pk associated with the one or more digital assets or the public key Pk is concatenated with a hash of a block header.

7. The computer-implemented method according to claim 5, wherein the data associated with each private key share comprises a quantity, and each transaction containing a quantity $g^{xi}$ is associated with a member of the congress.

8. The computer-implemented method according to claim 5, further comprising performing an exclusive or XOR operation of the recovery password and the data associated with the private key shares.

9. The computer-implemented method according to claim 5, wherein the mapping data is signed using private key Sk and mined into a proof-of-work blockchain on which a corresponding account resides.

10. The computer-implemented method according to claim 7, wherein the quantity $g^{xi}$ from each of the members of the congress are checked to confirm that they are consistent.

11. The computer-implemented method according to claim 10, wherein once the quantity $g^{xi}$ are checked to confirm that they are consistent, the following is constructed $$g^x = g^{\Sigma_i L_i x_i}, \text{ and}$$

where $g^x$ is a point on an elliptic curve and $L_i$ are Lagrange coefficients.

12. The computer implemented method for recovering one or more digital assets on a blockchain having access set up using the computer implemented method according to claim 1, the computer implemented method comprising:

accessing the one or more digital assets using the threshold signature scheme when the congress receives a transaction indicating a desire to recover the one or more digital assets.

13. The computer-implemented method according to claim 12, wherein the transaction sent to the congress indicating the desire to recover the one or more digital assets also identifies a recovery public key, and after accessing the one or more digital assets the one or more digital assets are transferred to the recovery public key.

14. The computer-implemented method according to claim 12, wherein after receiving the transaction indicating the desire to recover the one or more digital assets, the congress initiates a challenge period during which the congress monitors the blockchain for a veto transaction from a holder of the one or more assets, whereby if a valid veto transaction is observed then recovery of the one or more digital assets is aborted and any recovery deposit is confiscated.

15. The computer-implemented method according to claim 14, wherein recovery proceeds by verifying data corresponding to the recovery password, if verified as correct the one or more digital assets are recovered, if incorrect recovery of the one or more digital assets is aborted and any recovery deposit is confiscated.

16. The computer-implemented method according to claim 15, wherein the congress initiate a temporary proof-of-stake blockchain to verify the the data corresponding to the recovery password.

17. A non-transitory computer readable storage medium storing thereon computer-executable instructions that, when executed by a processor, cause the processor to perform the method of claim 1.

18. An electronic device comprising:
an interface device;
a processor coupled to the interface device; and
a memory coupled to the processor, the memory having stored thereon computer executable instructions that, when executed, configure the processor to perform the method of claim 1.

* * * * *